(12) United States Patent
Yoshida

(10) Patent No.: US 6,353,535 B1
(45) Date of Patent: Mar. 5, 2002

(54) PORTABLE COMPUTER HAVING DEFORMATION FUNCTION

(75) Inventor: Yuta Yoshida, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/250,437

(22) Filed: Feb. 16, 1999

(30) Foreign Application Priority Data

Feb. 16, 1998 (JP) .......................................... 10-032600

(51) Int. Cl.⁷ .............................. G06F 1/16; H05K 7/16
(52) U.S. Cl. ...................... 361/686; 361/683; 361/727; 361/684; 312/223.2; 312/292
(58) Field of Search .................................. 361/680, 683, 361/684, 685, 686, 728, 708.1; 312/205, 223.1

(56) References Cited

U.S. PATENT DOCUMENTS

| | | | | |
|---|---|---|---|---|
| 4,986,618 A | * | 1/1991 | Wakatsuki | 312/276 |
| 5,128,829 A | * | 7/1992 | Loew | 361/380 |
| 5,459,637 A | * | 10/1995 | Ma et al. | 361/686 |
| 5,572,402 A | * | 11/1996 | Jeong | 361/685 |
| 5,574,625 A | * | 11/1996 | Ohgami et al. | 361/684 |
| 5,640,302 A | * | 6/1997 | Kikinis | 361/687 |
| 5,661,634 A | * | 8/1997 | Obata et al. | 361/684 |

FOREIGN PATENT DOCUMENTS

| | | |
|---|---|---|
| JP | 2-213915 | 8/1990 |
| JP | 5-289776 | 11/1993 |
| JP | 7-219676 | 8/1995 |
| JP | 9-44953 | 2/1997 |
| JP | 9-160694 | 6/1997 |
| JP | 9-204763 | 8/1997 |
| JP | 9-265336 | 10/1997 |

* cited by examiner

*Primary Examiner*—Leo P. Picard
*Assistant Examiner*—Lisa Lea-Edmonds
(74) *Attorney, Agent, or Firm*—McGinn & Gibb, PLLC

(57) ABSTRACT

A portable computer has a first housing portion having a main body and a second housing portion which is reconfigurable. In the first configuration, the second housing portion is flat and in the second configuration, the second housing portion forms a receptacle for temporarily accommodating one or more option units such as CD-ROM drives or floppy disk drives.

12 Claims, 4 Drawing Sheets

1 NOTEBOOK COMPUTER
MAIN BODY 10
20 RECLOSABLE BOTTOM PORTION

PORTABLE COMPUTER HAVING DEFORMATION FUNCTION

BACKGROUND OF THE INVENTION

1. Field of the Invention

The present invention relates to portable computers designed to be moved easily such as notebook computers, and in particular to a portable computer provided with a mechanism designed to install an option unit such as a floppy disk drive or a CD-ROM drive on the main body thereof.

2. Description of the Related Art

Notebook computers have been widely used because of easy-to-carry size and weight. Conversely, reduction in size and weight causes difficulties in installation of option units. Therefore, there have been proposed various devices for connecting an option unit to the computer for expansion.

In an information processing device described in Japanese Patent Application Laid-Open No. 7-219676, bays for installing option units are formed in the main body. By attaching a dummy box instead of an option unit to be attached, exposed terminals and connectors are protected and the dummy box can also be used to put small articles therein.

A disk device described in Japanese Patent Application Laid-Open No. 9-044953 is incorporated in a notebook computer or the like. A stopper for regulating the forward movement from a tray disk replacing position can be moved between a first position projecting further backward from the rear end of the tray and a second position located forward from the rear end of the tray. As a result, the tray can be pulled out from a chassis longer by a moving distance of the stopper. Work for replacing the disk on the tray is thus facilitated.

A disk reading device described in Japanese Patent Application Laid-Open No. 9-204763 is designed to be capable of being attached to an electronic device in place of another external peripheral device. When a disk having such a size that the disk cannot be housed in the disk reading device is to be reproduced, reproduction is conducted in such a state that a drawer supporting the disk is pulled outside the main body of the disk reading device.

A separate function expanding device of a portable electronic device described in Japanese Patent Application Laid-Open No. 9-265336 is formed so that a portion corresponding to a port replicate device and another portion corresponding to an expansion unit may be separated. In the portion corresponding to the port replicate device, a locking means is provided. Accessory devices are thus made thin.

Eventually in these conventional devices, it is necessary to add parts, pull out a tray, or separate an expansion unit portion. When using options, the portability is reduced.

As other conventional examples, personal computers of built-in option type, cable connection type, and stack type using a docking station are known. In the personal computer of built-in option type, the external shape of the device is large and the weight is heavy, resulting in hampered portability. In the personal computer of cable connection type, since the floppy disk drive is not fixed, the floppy disk drive cannot be used in traveling.

In the personal computer of stack type having a docking station, traveling can be done while using the floppy disk drive or the CD-ROM drive mounted on the docking station. In this case, however, the weight and volume of the device as a whole are increased by not only the weight and volume of the floppy disk drive or the CD-ROM drive but also the weight and volume of the docking station. As a result, the portability is hampered.

SUMMARY OF THE INVENTION

Therefore, an object of the present invention is to provide such a mechanism that the portability is not reduced when attaching an option unit to the computer.

According to the present invention, a portable computer is comprised of a main body thereof and a recloseable receptacle coupled to bottom of the main body, for accommodating at least one option unit when the reclosable receptacle is opened, wherein a flat bottom is provided to the main body with the reclosable receptacle closed.

The reclosable receptacle may comprise a first plate and a second plate which are rotatably coupled to each other through a hinge to form a space for accommodating at least one option unit when the reclosable receptacle is opened. The first plate is kept perpendicular to the bottom of the main body and the second plate is kept parallel to the bottom of the main body when the reclosable receptacle is opened.

The reclosable receptacle forms an option accommodation space when opened and the bottom of the main body becomes flat when closed. Therefore, an option unit that cannot be accommodated within the main body can be attached to the main body by opening the reclosable receptacle. After removal of the option unit, the reclosable receptacle can be closed to provide a flat bottom to the main body.

DESCRIPTION OF THE PREFERRED EMBODIMENT

Figure 1A:
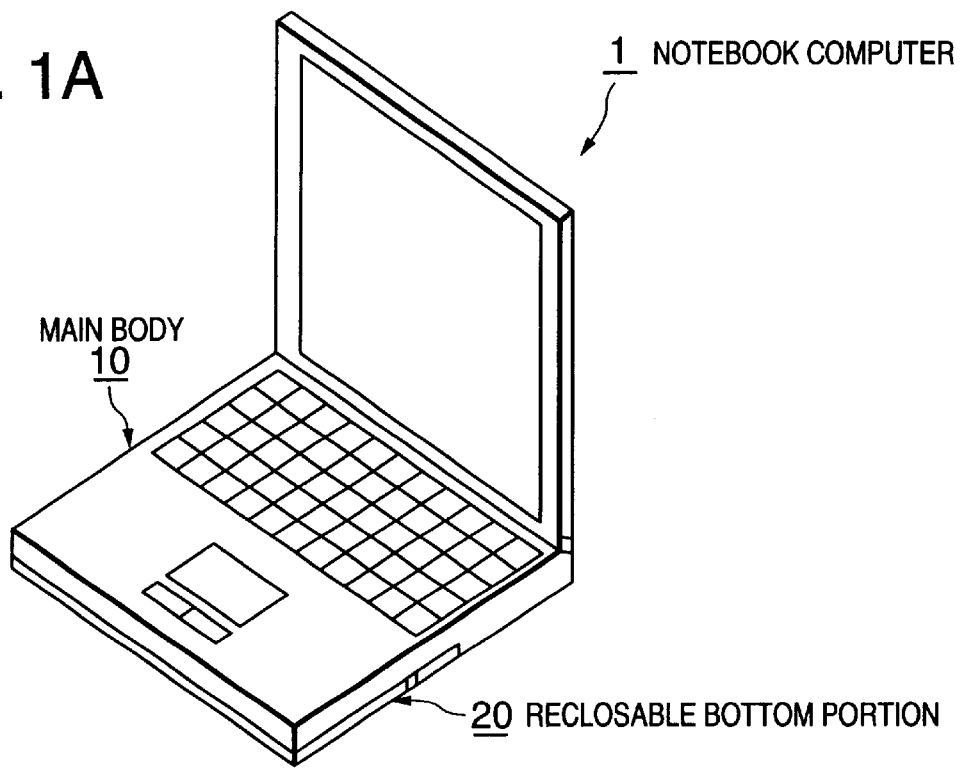
FIG. 1A is a perspective view of a notebook computer in a state that no option unit is attached thereto according to an embodiment of the present invention.

With reference to FIG. 1A, a notebook computer 1 is composed of a main body 10, and a reclosable bottom portion 20 provided on the bottom of the main body 10. The reclosable bottom portion 20 has a hinge mechanism by which the reclosable bottom portion 20 can be freely opened and closed. When accommodating or attaching option units, the reclosable bottom portion 20 is brought to an opened state to form a receptacle. After the option units have been removed, the reclosable bottom portion 20 passes to a closed state. In other words, the reclosable bottom portion 20 can switch between two states, i.e., the closed state and opened state owing to the hinge mechanism.

Figure 1C:
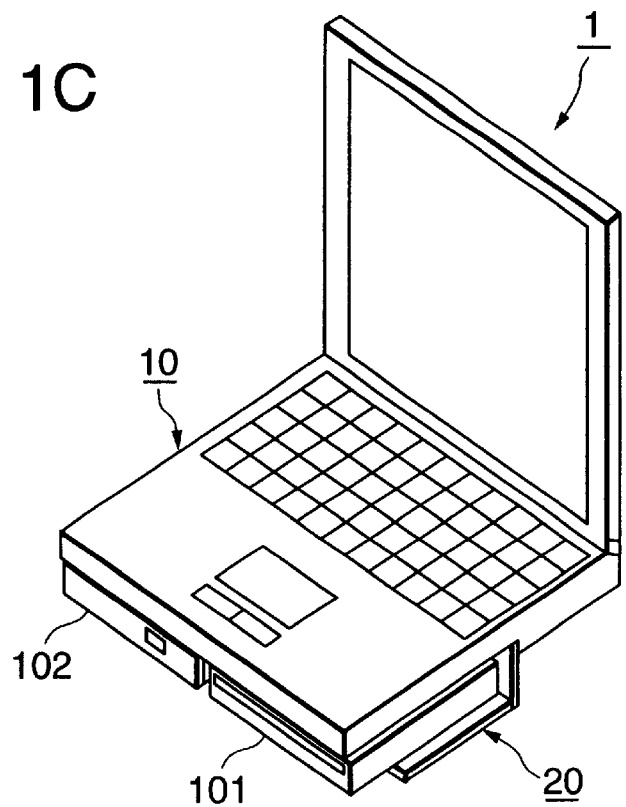
FIG. 1C is a perspective view of a notebook computer in a state that options have been attached thereto according to the embodiment.
Figure 1B:
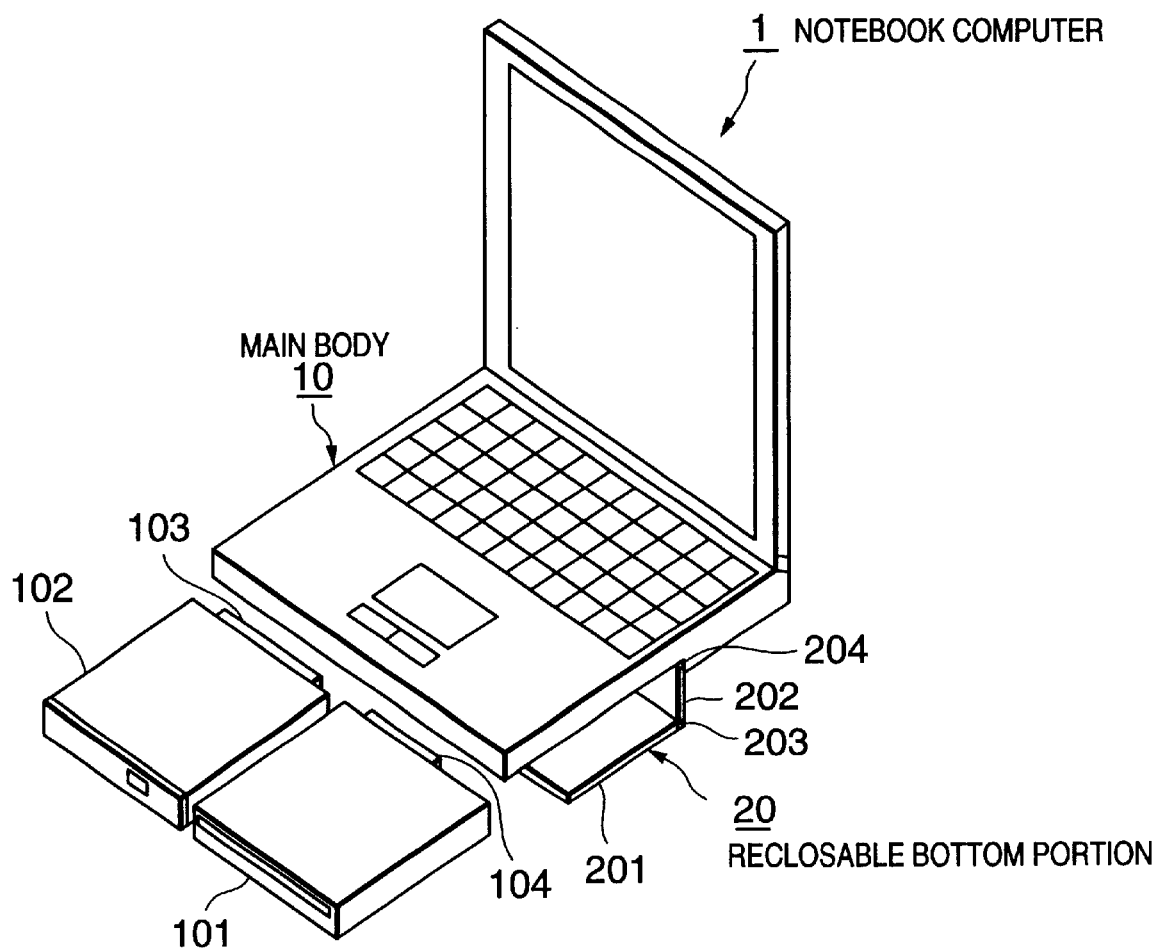
FIG. 1B is a perspective view of a notebook computer in a state immediately before attaching options thereto according to the embodiment.

As shown in FIG. 1B, the reclosable bottom portion 20 is divided into a bottom plate 201 and a connector plate 202 which are rotatably connected through a hinge portion 203.

When attaching two option units (hereinafter, a floppy disk drive 101 and a CD-ROM drive 102 are taken as an example) to the main body 10, the reclosable bottom portion 20 is brought to the open state by the hinge mechanism, as will be described in detail. This forms a space for attaching the floppy disk drive 101 and the CD-ROM drive 102 to the main body 10.

Needless to say, in addition to the option accommodation function, the main body 10 further has various functions for serving as a computer. In other words, the floppy disk drive 101 and the CD-ROM drive 102 are not permanently mounted on the main body 10. When closed, the reclosable bottom portion 20 provides the flat bottom of the notebook computer 1. Furthermore, each of the floppy disk drive 101 and the CD-ROM drive 102 has a packed form to facilitate the attachment.

As shown in FIG. 1C, when attaching the floppy disk drive 101 and the CD-ROM drive 102 to the main body 10, the reclosable bottom portion 20 is opened to form the option accommodation space on the bottom of the notebook computer 1. The option units (here, the floppy disk drive 101 and the CD-ROM drive 102) can be inserted into the space or bay formed by opening the reclosable bottom portion 20.

Figure 2:
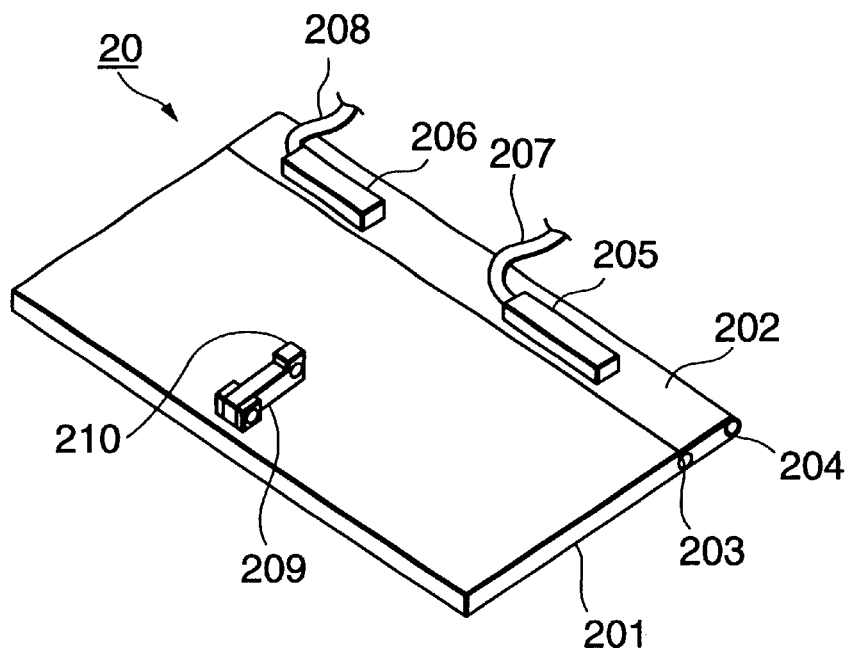
FIG. 2 is a perspective view of an installation mechanism employed in the embodiment in a closed state.

Referring to FIG. 2, the reclosable bottom portion 20 is composed of the hinge portion 203 and a hinge portion 204, which provide a hinge mechanism. Furthermore, the reclosable bottom portion 20 has the bottom plate 201 and the connector plate 202 which are rotatably connected through the hinge portion 23. The connector plate 202 has a floppy disk drive connector 205 and a CD-ROM drive connector 206 fixed thereon.

The floppy disk drive connector 205 is electrically connected to the computer circuit mounted in the main body 10 through a cable 207. Therefore, the floppy disk drive connector 205 causes the floppy disk drive 101 to be mechanically and electronically connected to the main body 10, and thereby data and control signals are transferred between the floppy disk drive 101 and the computer circuit of the main body 10.

Similarly, the CD-ROM drive connector 206 is electrically connected to the computer circuit mounted in the main body 10 through a cable 208. Therefore, the CD-ROM drive connector 206 causes the CD-ROM drive 102 to be mechanically and electronically connected to the main body 10, and thereby data and control signals are transferred between the CD-ROM drive 102 and the computer circuit of the main body 10.

In addition, the bottom plate 201 has a supporting column 209 for securing the option accommodation space when the reclosable bottom portion 20 is opened. One end of the supporting column 209 is rotatably connected to the bottom plate 201 to be raised straight up so as to be able to maintain the opened state of the reclosable bottom portion 20. The other end of supporting column 209 is bent to form a supporting portion 210 that is used to lock the bottom plate 201 in place. The hinge portion 203 rotatably couples the bottom plate 201 to the connector plate 202 such that the bottom plate 201 can rotate up to 90 degrees with respect to the connector plate 202. The hinge portion 204 rotatably couples the connector plate 202 to the main body 10 such that the connector plate 202 can rotate up to 90 degrees with respect to the bottom of the main body 10.

Figure 3:
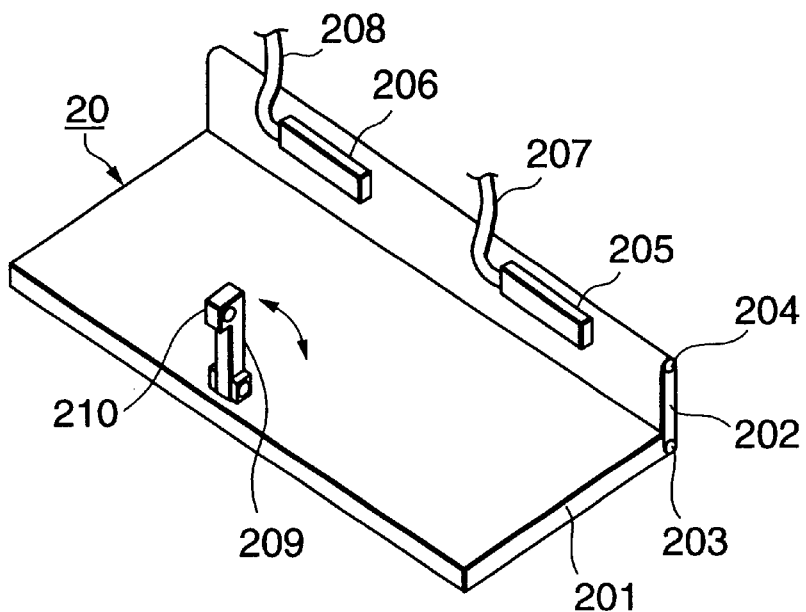
FIG. 3 is a perspective view of the installation mechanism employed in the embodiment in an opened state.
Figure 4:
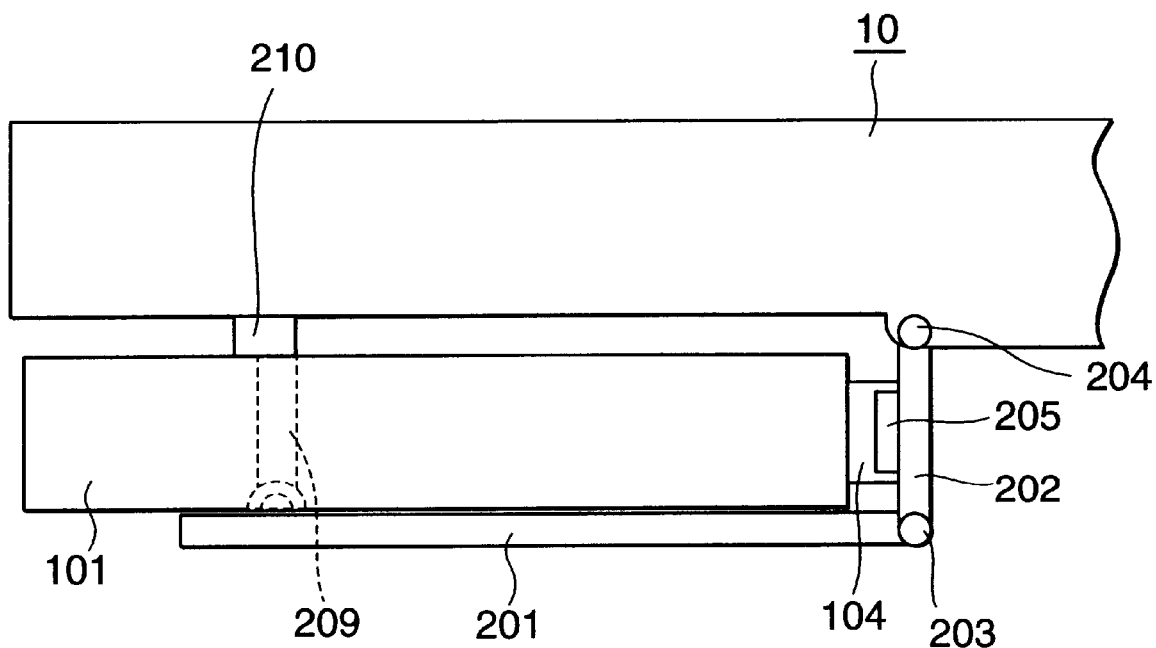
FIG. 4 is a partial side view of a notebook computer in a state that options have been attached thereto according to the embodiment.

Referring to FIGS. 3 and 4, the reclosable bottom portion 20 can be bent until the connector plate 202 becomes perpendicular to the bottom plate 201 with the hinge portion 203 serving as the boundary. Since the hinge portion 204 couples the connector plate 202 to the main body 10, it is made possible to bend the connector plate 202 with respect to the bottom plate 201 from the horizontal state to the vertical state. The bottom end of the supporting column 209 is fixed to the bottom plate 201 of the reclosable bottom portion 20, and it can be moved up to the state shown in FIG. 3. The supporting portion 210 of the supporting column 209 can come into contact with the bottom of the main body 10 when the supporting column 209 is raised (see FIG. 4). The supporting column 209 thus functions to make the bottom plate 201 always parallel to the main body 10.

By referring to FIGS. 1A through 1C, an operation of the embodiment will now be described. First of all, in the state of FIG. 1A, any option unit cannot be used. In the case where a floppy disk drive and a CD-ROM drive are needed, the reclosable bottom portion 20 is moved downward until the connector plate 202 becomes perpendicular to the main body 10. Here, the supporting column 209 functions to keep the bottom plate 201 of the reclosable bottom portion 20 parallel to the main body 10. In this way, the notebook computer 1 comes into the state shown in FIG. 1B. At this stage, the space for accommodating the floppy disk drive 101 and the CD-ROM drive 102 has been secured. Accordingly, the floppy disk drive 101 is inserted and connected to the floppy disk drive connector 205. Similarly, the CD-ROM drive 102 is inserted and connected to the CD-ROM drive connector 206. At this stage, the notebook computer 1 comes into the state shown in FIG. 1C or FIG. 4, and it becomes possible to use a floppy disk and a CD-ROM.

By the way, as option units other than the floppy disk drive and the CD-ROM drive, a battery pack, a hard disk drive, and a drive for a recording medium such as a DVD-ROM can also be attached to the main body 10 using the embodiment according to the present invention.

As described above, the present invention brings about the following advantages. Since a space can be dynamically formed within a notebook computer, option units such as a floppy disk drive and a CD-ROM drive can be incorporated in the notebook computer which originally cannot incorporate them.

Furthermore, when using option units, neither a cable nor a docking station is required. This results in an effect that excellent portability is maintained even when option units are used.

What is claimed is:

1. A portable computer to which an option unit can be attached, comprising:

a first housing portion having a main body; and a second housing portion, which is reconfigurable and connected to said first housing portion, wherein, in a first configuration, said second housing portion is flat, wherein, in a second configuration, said second housing portion forms a receptacle for temporarily accommodating at least one option unit, wherein said at least one option unit is temporarily inserted in said receptacle and temporarily connects directly to said receptacle, and wherein said second housing portion comprises a first plate and a second plate which are rotatably coupled to each other through a hinge to form said receptacle.

2. A portable computer according to claim 1, wherein in said second configuration, said first plate is kept perpendicular to a bottom portion of said main body and said second plate is kept parallel to a bottom portion of said main body.

3. A portable computer according to claim 2, wherein said first plate has a connector fixed thereon for temporarily connecting to each option unit.

4. A portable computer according to claim 2, wherein said second housing portion further comprises a supporting member fixed on said second plate, wherein, in said second configuration, said supporting member supports said second plate.

5. A portable computer according to claim 4, wherein in said second configuration, said supporting member raises straight up with respect to said second plate to come into contact with said bottom portion of said main body, and
   wherein, in said first configuration, said supporting member falls.

6. A portable computer according to claim 1, wherein in said second configuration, said personal computer is operable and utilizes said at least one option unit.

7. A portable computer to which an option unit can be attached, comprising:
   a first housing portion having a main body; and
   a second housing portion, which is reconfigurable and connected to said first housing portion,
   wherein, in a first configuration, said second housing portion is flat,
   wherein, in a second configuration, said second housing portion forms a receptacle for temporarily accommodating at least one option unit,
   wherein said at least one option unit is temporarily inserted in said receptacle and temporarily connects directly to said receptacle,
   wherein said second housing portion comprises a first plate and a second plate which are rotatably coupled to each other through a hinge to form said receptacle,
   wherein in said second configuration, said first and second plates are perpendicular to each other, and
   wherein in said first configuration, said first and second plates are coplanar.

8. A portable computer according to claim 7, wherein said first plate has a connector fixed thereon for temporarily connecting to each option unit.

9. A portable computer according to claim 8, wherein said second housing portion further comprises a supporting member fixed on said second plate, wherein, in said second configuration, said supporting member supports said second plate.

10. A portable computer according to claim 9, wherein in said second configuration, said supporting member raises straight up with respect to said second plate to come into contact with said bottom portion of said main body, and
    wherein, in said first configuration, said supporting member falls.

11. A portable computer to which an option unit can be attached, comprising:
    a first housing portion having a main body; and
    a second housing portion, which is reconfigurable and connected to said first housing portion,
    wherein, in a first configuration, said second housing portion is flat,
    wherein, in a second configuration, said second housing portion forms a receptacle for temporarily accommodating at least one option unit,
    wherein said at least one option unit is temporarily inserted in said receptacle and temporarily connects directly to said receptacle,
    wherein said option unit comprises one of a floppy disk drive unit, a CD-ROM drive unit, a battery pack, a hard disk drive unit and a DVD-ROM drive unit.

12. An option unit for use in a portable computer, said option unit comprising: one of a floppy disk drive unit, a CD-ROM drive unit, a battery pack, a hard disk drive unit and a DVD-ROM drive unit,
    wherein said portable computer comprises:
       a first housing portion having a main body; and
       a second housing portion, which is reconfigurable and connected to said first housing portion,
       wherein, in a first configuration, said second housing portion is flat,
       wherein, in a second configuration, said second housing portion forms a receptacle for temporarily accommodating at least one option unit, and
       wherein said at least one option unit is temporarily inserted in said receptacle and temporarily connects directly to said receptacle.

* * * * *